INVENTOR
GERARD EBERSOHL
BY: Paul M. Craig, Jr.
ATTORNEY

INVENTOR

GERARD EBERSOHL

BY: Paul M. Craig, Jr.

ATTORNEY

ELECTRONIC TAP CHANGING TRANSFORMER SYSTEMS

Filed Jan. 8, 1964 4 Sheets-Sheet 3

INVENTOR

GERARD EBERSOHL

BY: Paul M. Craig, Jr.

ATTORNEY

Sept. 5, 1967 G. EBERSOHL 3,340,462

ELECTRONIC TAP CHANGING TRANSFORMER SYSTEMS

Filed Jan. 8, 1964 4 Sheets-Sheet 4

INVENTOR
GERARD EBERSOHL
BY: Paul M. Craig, Jr.
ATTORNEY

United States Patent Office 3,340,462
Patented Sept. 5, 1967

3,340,462
ELECTRONIC TAP CHANGING TRANSFORMER SYSTEMS

Gerard Ebersohl, Aix-les-Bains, France, assignor to Compagnie Generale d'Electricite, Paris, France
Filed Jan. 8, 1964, Ser. No. 336,476
Claims priority, application France, Sept. 6, 1963, 946,832
12 Claims. (Cl. 323—43.5)

Electromechanical switching devices cannot operate without producing arcing at the time of circuit breaking and therefore cannot be installed in all media, and notably not in transformer tanks, without special precautions, which complicate their installation.

They are subject to wear which gives rise to maintenance costs. They require a complex apparatus which stores mechanical energy and transmits it. Their response time is not negligible and therefore they cannot be used in applications necessitating substantially instantaneous switching. Moreover, the duration of the switching obtained has the effect of allowing a current to be set up between the two circuit branches to be switched.

The present invention makes it possible to obviate these disadvantages in a particularly effective manner, and concerns improvements in on load switching devices which are intended to ensure the transfer of an alternating current from one branch of a circuit to another without power break, these improvements being characterized by the fact that the two branches to be switched comprise, respectively, two switching impedances which are capable of having very low value or a very high value and which are controlled by two control circuits capable of being triggered by a pulse from a means for detecting the zero point of the load current so as substantially simultaneously to bring one of the impedances from its very low value to its very high value and the other impedance from its very high value to its very low value.

In accordance with one embodiment of the invention, a bistable flip-flop, preferably of electronic form, comprises on the one hand two input circuits which are each connected by a control circuit to a member for detecting the zero point of the load current and which, under the action of a pulse from the said detecting means, are capable of producing a change-over, one from a state A to a state B and the other from the state B to the state A, which flip-flop comprises in addition two output circuits which, in accordance with the state of the flip-flop, supply one or other of two voltages conjugated with that of the other output circuit so that the voltages of these two outputs are different, the said two voltages determining the action of the control circuits of the switching impedances so as to render the first conductive and the second non-conductive in the state A and to render the first non-conductive and the second conductive in the state B.

In accordance with a preferred embodiment of the invention, each of the switching impedances consists of at least two thyristors or silicon controlled rectifiers which are connected in parallel, with opposite conducting directions, and are dependent upon the voltages supplied by one of the output circuits of the flip-flop.

Such a switching device consists of static elements. It cannot produce any arcing at circuit breaking. It ensures the transfer of the alternating current from one branch to the other in a period of time which is very short in relation to the duration of one cycle of the current. The change of the impedances from a conducting state to a non-conducting state and vice versa is quasi-instantaneous and complete. This operation is carried out at the instant when the alternating current has a zero momentary value. It is also possible to avoid any current between the two branches to be switched.

Further features and advantages of the invention will become apparent from the following description of embodiments and from the accompanying drawings, in which.

Figure 1:
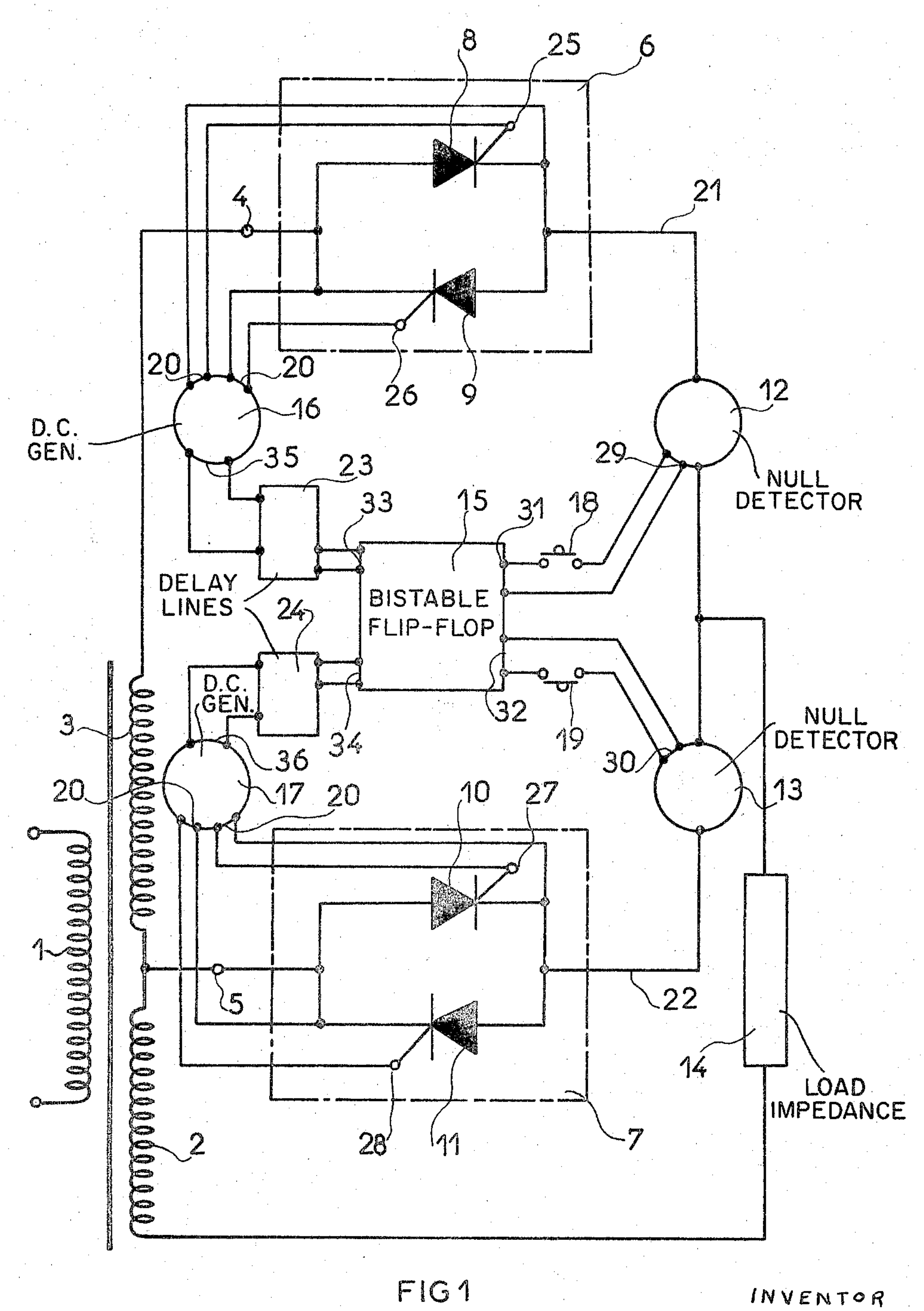
FIGURE 1 is the electric circuit diagram of a first example of a switching device according to the invention.

The switching device of FIGURE 1 is applied to the on-load adjustment of the voltage of a transformer having a primary winding 1 and a secondary winding divided into a main winding 2 and an adjustment winding 3, which is connected to the switching device by taps 4 and 5 so as to be placed out of circuit or in series with the main winding 2.

The load of the transformer is represented by an impedance 14, which may be of absolutely any linear or non-linear type. The transfer of the load current to the impedance 14 is effected either by means of the top 4 through a first branch 21 of the circuit comprising a switching impedance 6, or by means of the tap 5 through a second branch 22 comprising a switching impedance 7.

These two impedances consist of at least two thyristors 8 and 9, 10 and 11, which are connected in parallel to the terminals of the impedance with opposite conducting directions in order to permit the passage of the two half-cycles of the alternating current.

The two switching branches 21 and 22 comprise on the other hand devices 12 and 13 respectively for detecting the zero points of the current.

Any detecting device may be employed which is capable of emitting a pulse at the terminals 29 or 30 of a control circuit at the instant when the load current reaches a zero value. By way of example, such a device may consist of a magnetic circuit having a very rectangular hysteresis loop, which is appropriately dimensioned and biassed so that the load current can saturate it with a winding having a very small number of ampere turns. Under such conditions, a secondary winding on this magnetic circuit will supply at the terminals 29 or 30, at each zero point of the current, an alternative positive and negative pulse.

A bistable flip-flop 15, for example of the transistor type, comprises two input circuits 31 and 32 by means of which it is possible to produce a change-over from a state A to a state B under the action of a pulse of predetermined polarity at the terminals of the circuit 31 or a change-over from the state B to the state A under the action of a pulse at the terminals of the circuit 32.

This flip-flop comprises on the other hand two output circuits 33 and 34 which supply at their terminals respectively, conjugated voltages V*o* and V*m* in the state A and voltages V*m* and V*o* in the state B.

The input circuits 31 and 32 are connected through contacts 18 and 19 to the control circuits 29 and 30 respectively of the detectors.

The output terminals 33 of the flip-flop are connected to the terminals 35 of a bias circuit of a control D.C.

voltage generator 16 having separate outputs 20 connected to the striking electrodes 25 and 26 respectively and to the cathodes of the thyristors of the impedance 6.

The output terminals 34 of the flip-flop are connected to the terminals 36 of a bias circuit of a control D.C. voltage generator 17 also having separate output circuits 20 connected respectively to the striking electrode 27 and 28 and to the cathodes of the thyristors of the impedance 7.

The bias circuits of the generators 16 and 17 influence their operation so as to bring about operation with a voltage V*o* across their terminals and non-operation with a voltage V*m*.

Such control voltage generators may consist, for example, of electron tubes or semi-conductor cells having a bias electrode which enables it to operate with a voltage V*o* and which produces blocking of the generator with a voltage V*m*.

The suppression of the anode current of thyristor at an instant $t_2$ is insufficient to enable it to acquire its non-conducting state immediately, even if the voltage applied to its striking electrode is simultaneously suppressed. It is well known that during a period which may be of the order of 100$\mu$ the application of a voltage rendering the anode of this thyristor positive in relation to its cathode would enable it to restrike spontaneously despite the suppression of the voltage at its striking circuit. These conditions make it necessary to avoid the excessively rapid occurrence of voltages which might be generated at the striking of the thyristors of the impedance to be rendered non-conductive and which would be capable of rendering positive in relation to their cathodes the anodes of the thyristors of the impedance which is to be rendered non-conductive. It is therefore important that the cut-off of the striking voltage of the thyristors of the impedance which is to be rendered non-conductive should be brought about more rapidly than the striking of the thyristors of the impedance which is to be rendered conductive, in order that a short-circuit may not be set up between the taps 4 and 5 of the winding 3.

The bias circuit 35 of the generator 16 is for this purpose connected to the output circuit 33 of the flip-flop by way of a delay line 23. Likewise, the bias circuit 36 of the generator 17 is connected to the output circuit 34 of the flip-flop through a delay line 24. The delay lines 23 and 24 have a double time constant in order to obtain the change-over from a voltage V*m* to a voltage V*o* across the terminals of the bias circuits 35 and 36 with a greater delay than in the case of the change-over from a voltage V*o* to a voltage V*m*, so that the non-conducting state of one impedance will be brought about more rapidly than the conducting state of the other.

Figure 3:
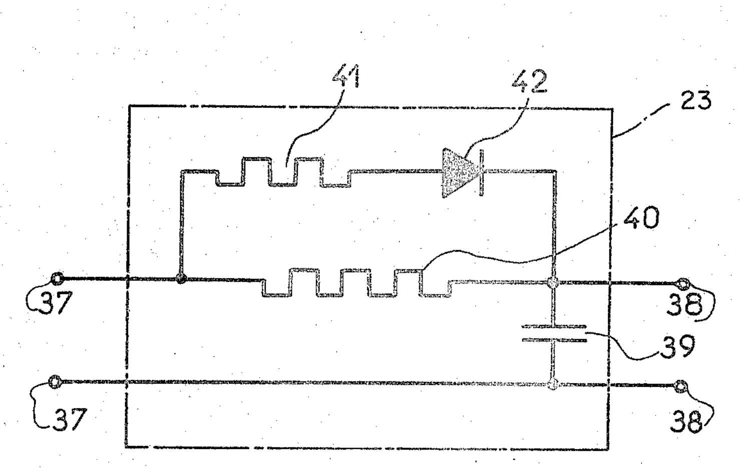
FIGURE 3 is the electric circuit diagram of a delay line.

The delay line illustrated by way of example in FIGURE 3 comprises input terminals 37 intended to be connected to one of the output circuits 33 and 34 of the flip-flop, and output terminals 38 intended to be connected to one of the bias circuits 35 and 36 of the generators 16 and 17.

A condenser 39 is connected between the output terminals 38 and the line comprises in its circuit a resistance 40, through which the condenser 39 is charged when the voltage increases across the input terminals 37.

A resistance 41 shunts the resistance 40 through a rectifier cell 42, of which the conducting direction permits the current to pass during the charging of the condenser. The delay line then has a low time constant T1 which is determined by the resultant of the resistances 40 and 41, which latter may be very small.

On the other hand, when the voltage across the input terminals 37 decreases, the condenser cannot be discharged through the resistance 41, since 42 is non-conducting. The delay line thus has a much greater time constant T2 during this phase of the operation.

Figure 4:
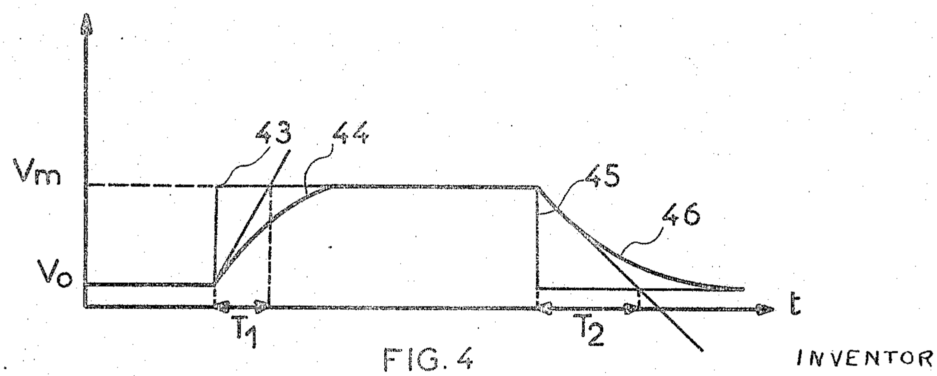
FIGURE 4 is a curve diagram illustrating the operation of the delay line of FIGURE 3.

As will be seen from the curve of FIGURE 4, when the voltage across the input terminals 37 of the delay line changes from a value V*o* to a value V*m*, in accordance with the curve 43, the voltage across the output terminals 38 increases very rapidly with a time constant T1, in accordance with the curve 44. The controlled thyristors rapidly become non-conducting.

When the voltage across the input terminals changes from the value V*m* to the value V*o* in accordance with the curve 45, the voltage across the output terminals decreases more slowly with a time constant T2, in accordance with the curve 46, and the conduction of the controlled thyristors is brought about with delay.

The branches 21 and 22 to be switched are very often at high voltages, and it is then necessary for the circuits for the application of voltage to the striking electrodes 25 and 26, 27 and 28, of the thyristors to be isolated from the low-voltage members, notably from the flip-flop 15 and from the control contacts 18 and 19.

To this end, the exciting voltages may be transmitted to the striking electrodes through an isolating transformer. This may be effected by making the generators 16 and 17, for example, in the form of an inverter supplying to the terminals of the primary winding of the isolating transformer, by induction in its secondary winding, a square-wave voltage which is thereafter rectifier. Such an inverter will comprise a bias circuit 35 or 36 which will enable it to operate with a bias voltage V*o* and which will prevent such operation with a bias voltage V*m*.

Figure 5:
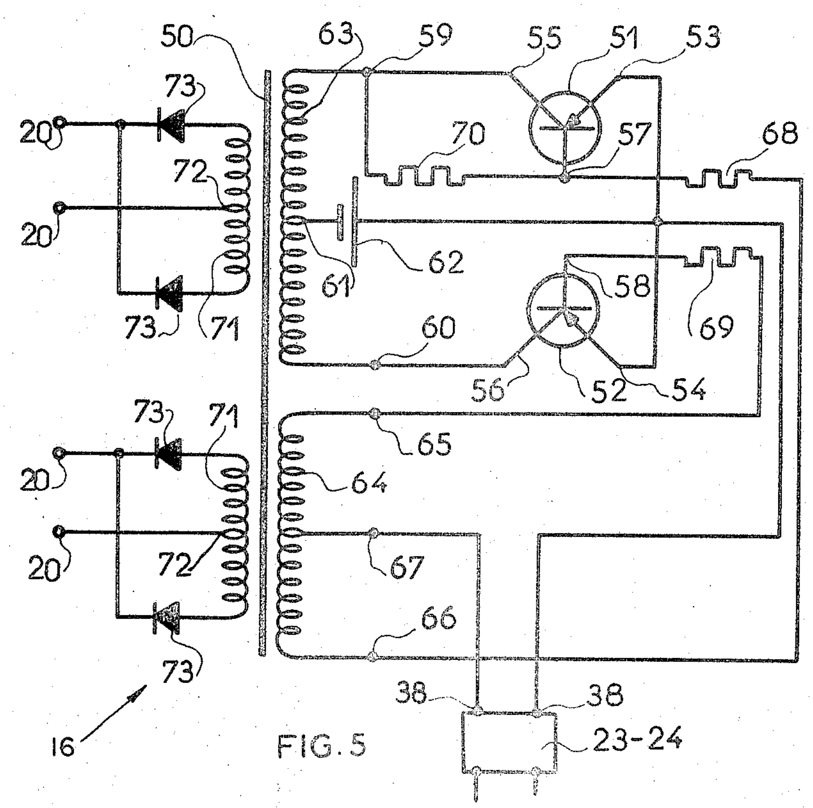
FIGURE 5 is the electric circuit diagram of an inverter.
Figure 6:
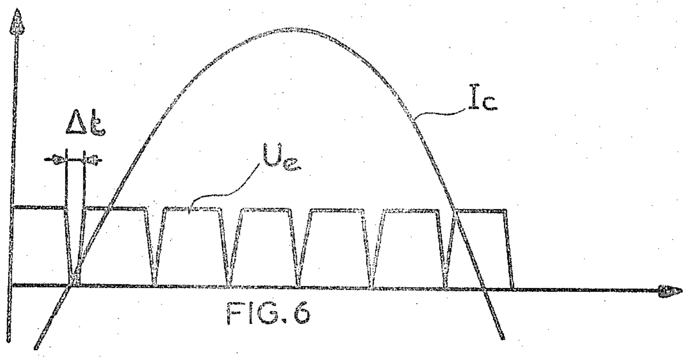
FIGURE 6 is the curve of the voltage supplied by the inverter of FIGURE 5 after rectification.

There can be obtained from the square-wave voltage a quasi-unidirectional exciting voltage in accordance with the curve U*e* of the diagram of FIGURE 6. It may happen that an interval between two square waves of the rectifier voltage U*e* coincides with the beginning of a half-cycle of the load current I*c* passed through the thyristor, which is excited by this voltage, as has been illustrated in the diagram of FIGURE 5. It is therefore important that the dead time A*t* between two square waves should be so low that even in such a case the restriking of the thyristor is ensured when it is to resume the conduction of the load current.

Such an inverter isolated from the high-voltage exciting circuits may be constructed by way of example in accordance with the diagram of FIGURE 5.

An isolating transformer 50 comprises a primary winding 63 having a mid-point 61. The negative pole of a direct-current source 62 is connected to the mid-point 61 of the winding 63 and its positive pole is connected alternatively to the two ends 59 and 60 of the winding by one or other of two synchronised switches which consist of transistors 51 and 52, which are of the PNP type in this example.

The emitters 53 and 54 of the transistors are connected to the positive pole of the current source 62 and their collectors 55 and 56 are connected to the ends 59 and 60 of the winding 63.

A secondary winding 64 controlling the transistors is mounted on the magnetic circuit of the transformer and comprises a mid-point 67 connected to the emitters 53 and 54, while its ends 65 and 66 are connected to the bases 57 and 58 through resistances 68 and 69 intended to limit the current in the base circuits. A resistance 70 connects the base 57 of the transistor 51 to its collector 55 in order to introduce an unbalance, by means of which the relaxation can be triggered.

The connection of the mid-point 67 to the emitters 53 and 54 is effected by means of the output terminals 38 of the delay line 23 or 24, so that when a voltage V*m* is set up across these terminals, this voltage renders the bases 57 and 58 positive in relation to the emitters 53 and 54 and the two transistors are thus rendered non-conductive.

When a voltage V*o* in the neighborhood of zero is set up across the output terminals 38 of the delay line, the inverter will operate normally. A linearly increasing current will pass successively through the two transistors in order to induce a square-wave voltage in the secondary winding of the transformer 50.

This secondary winding comprises as many windings 71 as there are thyristors constituting the impedance to be controlled, i.e. two secondary windings 71 in the case of the switch according to FIGURE 1. Each winding 71 feeds with a mid-point 72 a two-anode rectifier comprising two rectifier cells 73 for supplying at two output terminals 20 a quasi-unidirectional voltage in accordance with the diagram of FIGURE 6.

The switching device of FIGURE 1 then operates as follows:

When the flip-flop 15 is in the state A, it supplies a voltage V*o* at its output terminals 33 and a voltage V*m* at its output terminals 34. The voltage V*o* brings about the operation of the generator 16 and the conduction of the impedance 6. The voltage V*m* prevents operation of the generator 17 and the impedance 7 is non-conducting. The branch 21 alone then carries the load current.

When the flip-flop 15 is in the state B, it supplies a voltage V*m* at its output terminals 33 and a voltage V*o* at its output terminals 34. The generator 16 is non-operative and the impedance 6 is insulating or non-conducting. The generator 17 operates and the impedance 7 is conducting. The branch 22 alone then carries the load current.

The switching from the branch 21 to the branch 22 is effected by a change-over from the state A to the state B. When the impedance 6 is conducting in accordance with the curve I6 of the diagram of FIGURE 2, the control contact 18 may be closed at any instant, for example in the course of a negative half-cycle represented in the curve I6. The change-over takes place only at the time $t_2$ without the pulse at the time $t_1$ having any effect, if the required polarity for acting on the input circuit 31 of the flip-flop is that of the pulse emitted at the end of a positive half-cycle.

The change-over from the state A to the state B is extremely rapid. The load current is carried almost immediately by the impedance 7 in accordance with the curve I7 in FIGURE 2 and the current across the load impedance 14 conforms to the curve I14 of this diagram. At the instant $t_2$, the voltage across the output terminals 33 of the flip-flop 15 immediately changes from the value V*o* to V*m*, and the generator 16 immediately ceases to operate. The voltages which were applied by this generator to the electrodes 25 and 26 of the thyristors 8 and 9 are therefore suppressed at this instant $t_2$.

The anode-cathode voltage of the thyristor 9 was negative during the positive half-cycle preceding the instant $t_2$. No anode current flowed therethrough and it immediately changes to the non-conducting state at the cut-off at $t_2$ of its striking voltage.

The thyristor 8, on the other hand, was traversed by an anode current during the half-cycle preceding the instant $t_2$. This thyristor is therefore capable of being restruck during a period which may be of the order of 100$\mu$, after the instant $t_2$. This restriking could be effected at 100$\mu$ following the striking of the thyristors 10 and 11 of the impedance 7. This restriking is avoided by the delay line 23, due to which the bias voltage of the generator 16 will change from the value V*o* to the value V*m* with a very small time constant T1, which will have the effect of producing an almost instantaneous blocking of the generator. However, the delay line 24 will only permit with a larger time constant T2 the change of the bias voltage of the generator 17 from the value V*m* to the value V*o* in order to bring about a small delay at the return of the impedance 7 to the conducting state. The impedance 6 may thus finally acquire its non-conducting state before the impedance 7 is conducting, whereby all danger of short-circuiting between the taps 4 and 5 of the adjusting winding 3 of the transformer can be avoided. This very slight delay, however, has no appreciable effect on the curve of the load current I*c*.

The switching from the branch 22 to the branch 21 takes place by an identical process due to a change from the state B to the state A of the flip-flop 15 by closing the contact 19 at any instant.

It will be noted that in accordance with the embodiment of the invention of FIGURE 1 the striking electrodes of the thyristors of the impedance which is to be conductive are maintained continuously under voltage during the transit period of the load current.

The majority of thyristors are capable of withstanding without detriment the prolonged current which results therefrom in their striking circuits. However, in the case of thyristors with which this current would not be continuously possible, it is possible to avoid it, for example, by connecting a D.C. voltage generator to the anode and the cathode of each of the thyristors throughout the duration of the transit in order to conduct a current capable of maintaining the striking of the thyristor. A single pulse at the striking electrodes of the thyristors is then sufficient to initiate their conduction.

Figure 7:
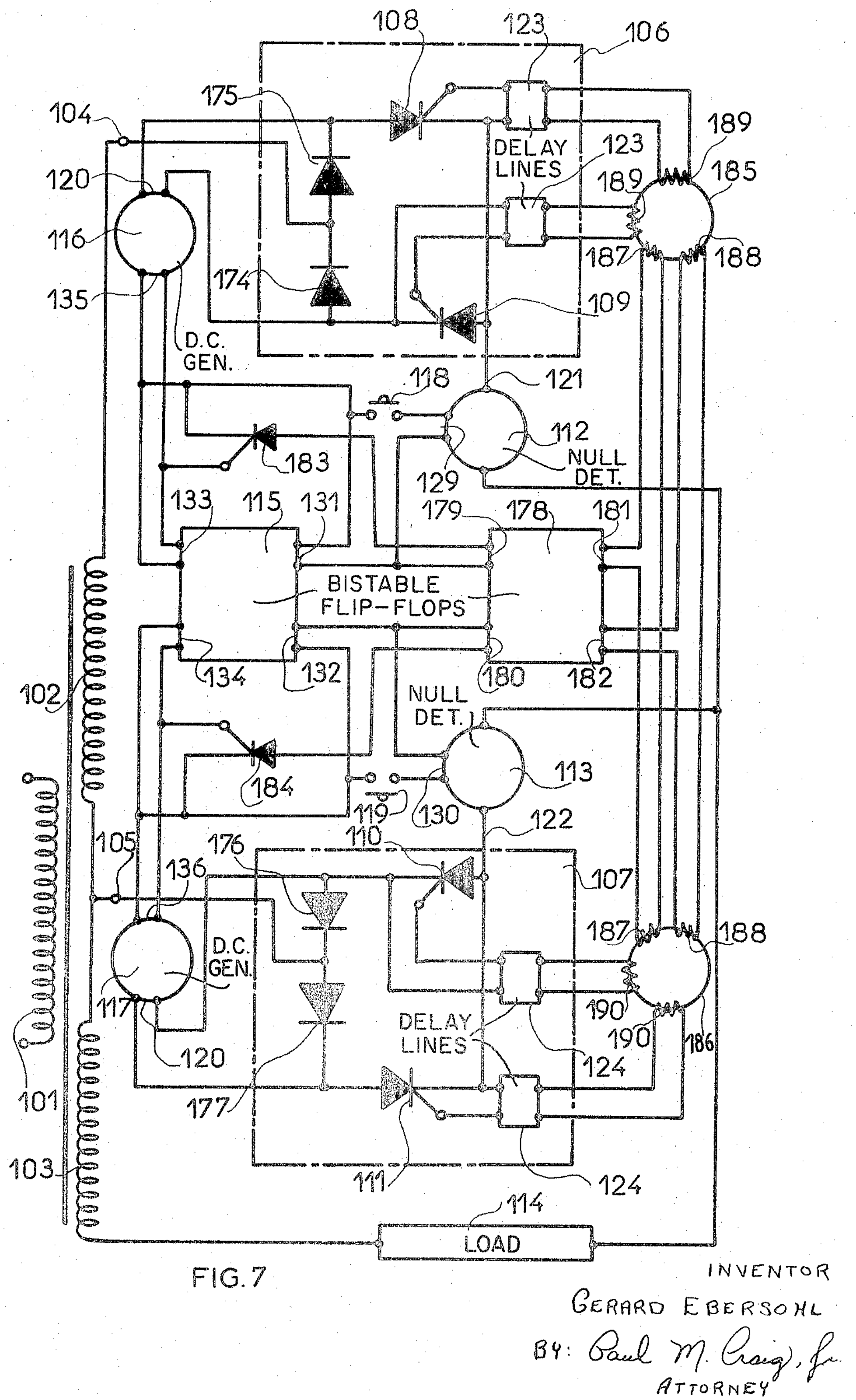
FIGURE 7 is the electric circuit diagram of a second example of a switching device according to the invention.

This result is obtained by the embodiment of FIGURE 7, which is applied in the same way to the on load adjustment of the voltage of a transformer having a primary winding 101, a main secondary winding 102 and an adjusting winding 103 which is connected by taps 104 and 105 to two switching branches 121 and 122 for conducting the current to a load 114 through either one of these two branches.

Similarly, the branches 121 and 122 each comprise a switching impedance 106, 107 and a device 112, 113 for detecting the zero point of the current in the control circuit, the said detecting devices comprising output terminals 129, 130.

The impedance 106 consists of a loop comprising two diodes 174 and 175 and of two thyristors 108 and 109 in series with one another with the same direction of conduction along the loop.

The switching branch 121 is connected on the one hand between the cathode and the anode of the diodes 174 and 175 and on the other hand between the cathode and the anode of the thyristors 108 and 109. A D.C. voltage generator 116, controlled by a bias circuit having input terminals 135, is connected by output terminals 121, on the one hand by its positive pole between the anode of the thyristor 108 and the cathode of the diode 175, and on the other hand by its negative pole between the cathode of the thyristor 109 and the anode of the diode 174. The circuit of this generator will therefore be closed by the thyristors when they are excited, without the D.C. current being able to pass through these diodes.

The impedance 107 likewise comprises two diodes 176 and 177 and two thyristors 110 and 111, similarly connected together. The impedance is connected in the same way to the switching branch 122 and to the output terminals 120 of a D.C. voltage generator controlled by a bias circuit having two input terminals 136.

The D.C. voltage generators 116 and 117 may be constructed in accordance with the same principle as those of the switch of FIGURE 1, and for example it will consist of an inverter feeding into a transformer to supply a quasi-unidirectional voltage across the terminals of a rectifier.

A bistable flip-flop 115 comprises an input circuit 131 capable of changing it over from a state A to a state B under the action of a pulse at its terminals and on the other hand an input circuit 132 capable of changing it over in the opposite direction from the state B to the state A by means of a pulse at its terminals.

The input terminals 131 are connected to the control terminals 129 of the detector 112 through a control contact 118. The input terminals 132 are connected to the control terminals 130 of the detector 113 through a control contact 119.

The flip-flop 115 supplies in the state A a voltage V*o* across output terminals 133 and a voltage V*m* across output terminals 134. Conversely, in the state B, a voltage V*m* is obtained across the terminals 133 and a voltage V*o* across the terminals 134. The terminals 133 are connected to the terminals 135 of the bias circuit of the generator 116 and the terminals 134 are connected to the terminals 136 of the bias circuit of the generator 117 in order to control the operation of the generators with a bias voltage V*o* and to block them with a voltage V*m*.

A second bistable flip-flop 178 comprises two input circuits 179 and 180 capable of triggering a change-over from a state A to a state B under the action of a pulse at the terminals 179 and an opposite change-over under the action of a pulse at the terminals 180. A first output circuit supplies in the state A a voltage V*e* across its terminals 181 and a second output circuit supplies, in the state B, the voltage V*e* across its terminals 182.

The input terminals 179 are connected to the input terminals 131 of the first flip-flop through a low-power thyristor 183, of which the striking circuit is connected to the output terminals 133 of the flip-flop 115 in such manner that this thyristor is rendered conductive only by the voltage V*m* across the terminals 133 after a change-over to the state B of the flip-flop 115.

Similarly, the input terminals 180 are connected to the input terminals 132 of the flip-flop 115 through a thyristor 184 having its striking circuit connected to the output terminals 134 of the flip-flop 115.

Two windings 187 are connected in series to the output terminals 181 of the flip-flop 178 and are mounted, respectively, on two magnetic circuits 185 and 186 having a rectangular hysteresis loop with a number of turns sufficient to saturate these magnetic circuits when a voltage V*e* is set up across the terminals 181.

Two windings 188 are connected in series to the output terminals 182 of the flip-flop 178 and are likewise mounted on the magnetic circuits 185 and 186 having the same number of turns as the windings 187, but having ampere-turns of opposite direction, under the effect of a voltage V*e* across the terminals 182.

The magnetic circuit 185 comprises two secondary windings 189 and the magnetic circuit 186 comprises two secondary windings 190. Pulses of opposite direction will be induced in these windings depending upon whether a voltage V*e* is set up across the terminals 181 or 182. The windings 189 are connected to the striking circuits of the thyristors of the impedance 106 with a direction such that the striking is effected by that one of the pulses which is induced when a voltage V*e* is set up across the terminals 181, a pulse induced by a voltage V*e* across the terminals 182 having no effect on the impedance 106. Likewise, the windings 190 are connected to the striking circuits of the thyristors of the impedance 107 in order to produce the striking of these thyristors when a voltage V*e* is set up across the terminals 182.

As in the case of the switch of FIGURE 1, the controls of the striking circuits comprise delay lines 123 and 124, but these delay lines have a single time constant which is such as to introduce a delay into the striking, by virtue of which the impedance can be rendered conductive only when the impedance of the other branch to be switched has become completely non-conductive.

The switching then takes place as follows: with the flip-flops 115 and 178 in the state A, the generator 116 producing a unidirectional or quasi-unidirectional voltage operates. The thyristors 108 and 109 of the impedance 106 having been struck after the preceding change-over to the state A as is explained in the following, the generator 116 continuously sends through the thyristors a direct current which maintains them in their conducting state. The branch 121 consequently carries the current from the tap 104 to the load 114. The generator 117 is rendered non-conductive by the voltage V*m* across the output terminals 134 of the flip-flop 115 and the switching branch 122 is non-conductive.

Figure 2:
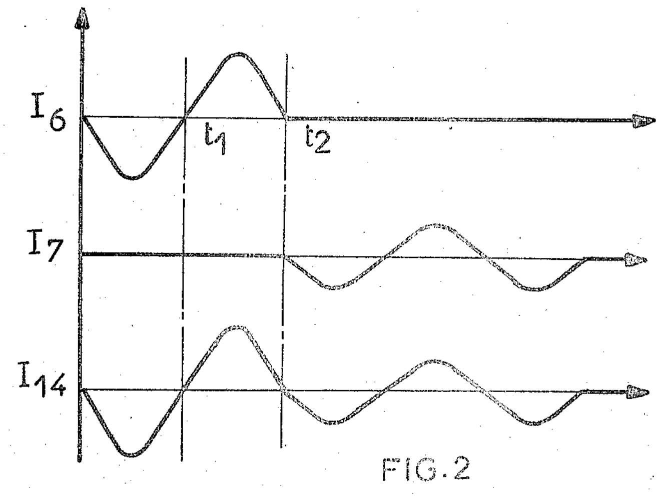
FIGURE 2 is a curve diagram illustrating the switching carried out by the device of FIGURE 1.

The switching from the branch 121 to the branch 122 is effected by closing the control contact 118 at any instant, for example in the course of the negative half-cycle of the load current carried through the impedance 106 in accordance with the curve I6 of the diagram of FIGURE 2.

The control terminals 129 of the detector 112 are connected to the input terminals 131 of the flip-flop 115, so that the pulse at the time *t*1 at the end of the negative half-cycle corresponds to the required polarity for producing a change-over. The flip-flop 115 therefore changes to the state B at the time *t*1.

The voltage across the output terminals 133 of the flip-flop 115 changes from V*o* to V*m* and the generator 116 ceases to operate. The striking of the thyristors 108 and 109 of the impedance 106 is no longer maintained by the generator 116. However, this striking subsists during a very short period which may be of the order of 100$\mu$s, but which is sufficient nevertheless to maintain the conduction of the thyristor 108 when it is placed under voltage by the positive half-cycle succeeding the time *t*1. The impedance 106 thus becomes non-conducting only at the time *t*2.

The voltage across the output terminals 134 of the flip-flop 115 simultaneously changes at the time *t*1 from V*m* to V*o*, which brings about the operation of the generator 117. However, the thyristors 110 and 111 of the impedance 107 are not yet struck and the generator 117 cannot yet feed into the thyristors.

The voltage V*m* across the output terminals 133 of the flip-flop 115 strikes the thyristor 183 and the input terminals 179 of the flip-flop 178 are then connected to the control terminals 129 of the detector 112. The succeeding pulse of the latter, at the time *t*2, will therefore reach the terminals 179. The connections are so designed that this latter pulse corresponds to the required polarity for bringing about a change-over of the flip-flop 178, and the latter changes to the state B at the time *t*2.

The voltage V*e* across the output terminals 181 of the flip-flop 178 disappears and a voltage V*e* simultaneously appears across the output terminals 182. The windings 188 are energized, while the windings 187 cease to be energized. The ampere-turns of these windings being of opposite direction, the saturation of the magnetic circuits 185 and 186 changes direction. A pulse is induced in the windings 189 and 190. The connections of the striking circuits of the thyristors 110 and 111 to the windings 190 are so made that the pulse which is then emitted has the required polarity for bringing about the striking of the thyristors 110 and 111. On the other hand, the connections of the striking circuits of the thyristors 108 and 109 to the windings 189 are established in such manner that the pulse emitted is of opposite polarity to that which brings about the striking and thus remains ineffective.

The impedance 107 therefore becomes conductive at the time *t*2 and the generator 117 sustains this conducting state.

The windings 189 and 190 which bring about the commencement of the conduction of the impedances 106 and 107 are connected to the striking circuits of the thyristors through delay lines 123 and 124 so that an impedance commences to conduct only with a slight delay after the commencement of the non-conducting state of the other impedance. The delay lines 123 and 124 can then have a single time constant.

The switching from the branch 122 to the branch 121 is effected in a similar manner by closing the control contact 119. The flip-flop 115 changes to the state A. The generator 116 operates and the generator 117 is blocked by the voltage V*m* across the terminals 134. The flip-flop 178 also changes to the state A a half-cycle after the flip-flop 115. The voltage V*e* across the terminals 182 disappears and a voltage V*e* is set up across the terminals 181. The windings 187 are energized and the windings 188 cease to be energized. The saturation of the magnetic circuits 185 and 186 changes direction and brings about a pulse at the striking electrodes of the thyristors, which is of opposite direction to that in the preceding case. The thyristors 108 and 109 are thus struck and the impedance 106 becomes conductive.

As in the first embodiment of the invention, therefore, the switching is effected in a quasi-instantaneous manner when the current across the load passes through zero, this switching also being characterized by a complete absence of circulation current between the changed-over taps of the transformer.

It will be apparent from the analysis of the operation of the two devices according to the invention, that in the case of a periodic current under steady conditions, the switching between the two taps of the transformer may be effected at each cycle of the current if this is necessary. The switches thus produced are therefore characterized by a very high switching speed, which imparts to these devices a very great advantage over electro-mechanical switches in certain applications in which the voltage across the terminals of the load impedances of the transformer must be very rapidly adjusted.

It is obvious that in these two types of switch according to the invention, overvoltages may be applied during a very short period of time to the semi-conductors constituting the switching impedances at the time of the switching, notably when the load is inductive, the zero point of the current in the latter then coinciding at the instant when the voltage across the terminals of the winding of the transformer is maximum and equal to $U\sqrt{2}$.

With the object of affording effective protection to the two switching impedances against overvoltages, it will be possible to shunt them by means of elements having non-linear characteristics, such as Zener effect semi-conductors, for example, which are appropriately connected for ensuring a voltage limitation regardless of the polarity of the overvoltage wave. These elements will obviously be so chosen that, under the maximum voltage existing across the terminals of a switching impedance in the non-conducting state and operating under normal conditions, they have an impedance comparable to that of the impedance which they are intended to protect.

Figure 8:
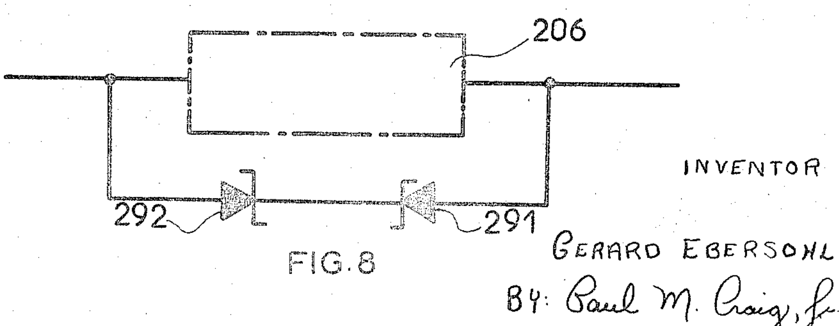
FIGURE 8 is the electric circuit diagram of the connection of Zener diodes to the terminals of a switching impedance.

Such a mode of protecting the switching impedances may be carried into effect, for example, in accordance with FIGURE 8, in which there are shown two Zener diodes 291 and 292 connected with opposite directions, in series to the terminals of the impedance to be protected, which is shown at 206.

The two Zener diodes are so chosen that their Zener voltage is lower than the minimum voltage capable of damaging the thyristors of the impedance, but is nevertheless appreciably higher than the peak voltage occurring under nominal operating conditions at the terminals of the impedance when its thyristors are non-conducting.

It is obvious that the present invention is applicable to all transformers having multiple taps in any desired number, of which two of the taps are chosen in known manner by a tap selector before the switching.

I claim:

1. An on-load switching arrangement for effecting the transfer of a current from one branch of a circuit to another without power interruption to the load impedance comprising first and second switching impedances each switchable between very high and relatively low impedance states, first and second control means for switching said first and second switching impedances, respectively, to their low impedance states upon actuation thereof, bistable actuating means selectively actuating said first or said second control means, respectively, in the first and second switching states thereof, first and second null detectors connected in series with said first and second switching impedance, respectively, for switching said bistable actuating means to its other switching state at the time of zero current in the output of the switching impedance connected thereto, and a source of voltage connected to each of said first and second switching impedances.

2. The combination defined in claim 1 wherein said bistable actuating means comprises a flip-flop having a pair of input circuits respectively connected to said first and second null detectors and a pair of output circuits respectively connected to said first and second control means, said flip-flop being switchable between said first and second switching states to supply one and another of two voltages to said respective output circuits, these two voltages serving to selectively actuate said control means so as to render said first switching impedance conductive and said second switching impedance non-conductive in the first switching state of said flip-flop and said first switching impedance non-conductive and said second switching impedance conductive in said second switching state.

3. The combination defined in claim 1, wherein said null detectors emit a control signal at the zero value of applied current and are selectively manually connected to said bistable actuating means.

4. The combination defined in claim 1 wherein each of said switching impedances consists of at least two thyristors connected in parallel with opposite conducting directions.

5. The combination defined in claim 4 wherein said first and second control means are in the form of D.C. voltage generators having operative and inoperative states corresponding to the levels of voltage applied thereto by said bistable actuating means.

6. The combination defined in claim 1 further comprising first and second delay circuits connected respectively between the outputs of said bistable actuating means and said first and second control means and having a double time constant providing for greater delay during voltage drop than during voltage rise.

7. The combination defined in claim 5 wherein said D.C. voltage generators include a transformer, an inverter coupled to said transformer and having a bias circuit coupled to said bistable actuating means and said transformer for inducing a square wave voltage in a secondary winding of said transformer.

8. In an electronic tap changing transformer system including a transformer having a primary winding supplied by an alternating voltage source, a first secondary winding, a second secondary winding series connected with said first secondary winding, said first secondary winding having a terminal connected to a first terminal of a load, said second secondary winding having a terminal connected to a second terminal of said load through a first pair of silicon controlled rectifiers connected in parallel and in opposition, the common point of said secondary windings being connected to said load second terminal through a second pair of silicon controlled rectifiers connected in parallel and in opposition, a first controlling signal generator the output terminals of which are connected to the control electrodes of said first pair of silicon controlled rectifiers, a second controlling signal generator the output terminals of which are connected to the control electrodes of said second pair of silicon controlled rectifiers, both generators having input terminals for supplying said rectifiers, the improvement consisting in a null current detector inserted between each of said pairs of silicon cotrolled rectifiers and said second load terminal, each of said null current detectors having a circuit emitting a pulse at zero current value, said null current detectors being respectively connected through switching circuits to an input terminal of a bistable flip-flop having two input terminals, said flip-flop under the action of a pulse from the first of said null current detectors being switched from a state A to a state B, and under the action of a pulse from the second of said null current detectors being switched from said state B to said state A, said flip-flop comprising two output circuits which, in accordance with the state of the flip-flop, supply the input terminals of one or the other of said generators.

9. An electronic tap changing transformer system as claimed in claim 8 in which the output of each of said controlling signal generators is connected to the striking electrode and to the cathode of a silicon controlled rectifier through a delay line having a double time constant providing a greater delay in the firing of the silicon controlled rectifier than that which is introduced at the cessation of the excitation of its striking electrode.

10. An electronic tap changing transformer system as claimed in claim 8 in which said controlling signal generators consist of an inverter which includes a bias circuit connected to one of the output circuits of said flip-flop and which feeds into a primary winding of a transformer thereby inducing a square-wave voltage in at least one secondary winding connected to a rectifier supplying a quasi-unidirectional voltage.

11. An electronic tap changing transformer system as claimed in claim 8 in which elements having non linear resistances are connected to the terminals of each pair of silicon controlled rectifiers so as to deflect any overvoltage capable of damaging said silicon controlled rectifier.

12. An electronic tap changing transformer system including a transformer having a primary winding supplied by an alternating voltage source, a first secondary winding series connected with a second secondary winding, the first secondary winding having a terminal connected to the first terminal of a load and a second terminal connected to a second terminal of said load through a first switching impedance, the second secondary winding having a terminal connected to the load through a second switching impedance, each switching impedance having two terminals and including two diodes and two thyristors series connected into a loop and having the same direction of conduction around said loop, said impedance terminals being respectively the point between the diodes and the point between the thyristors, two null current detectors being disposed respectively between said first and second impedances and said load, a first D.C. voltage generator controlled by a bias voltage and having two input terminals and two output terminals respectively connected by its positive pole between the anode of one thyristor and the cathode of one diode of said first switching impedance and by its negative pole between the cathode of the other thyristor and the anode of the other diode of said first switching impedance, a second D.C. voltage generator identical to said first D.C. voltage generator and similarly connected to said second switching impedance, a first bistable flip-flop having two input circuits and being switchable from a state A to a state B when a pulse is furnished at the terminals of its first input circuit and from a state B to a state A when a pulse is furnished at the terminals of its second input circuit, said flip-flop having a first output circuit and a second output circuit, a voltage V*o* being obtained at the first output circuit, and a voltage V*m* being obtained at the second output circuit when said flip-flop is in its A state, the contrary occurring when said flip-flop is in its B state, the output during the A state serving as a bias for actuating the first D.C. voltage generator and the output during the B state serving as a bias for actuating the second D.C. voltage generator, said generators delivering an output current when biased by V*o* and being blocked when biased by V*m*, a second bistable flip-flop circuit having a first and second input circuit and a first and a second output circuit and being capable of switching from a state A to a state B under the action of a pulse at its first input terminals and an opposite change-over under the action of a pulse at its second input terminals and delivering a voltage V*e* across its first output terminals when in state A and a voltage V*e* across its second output terminals when in state B, the first input terminals of said second flip-flop being connected to the input terminals of said first flip-flop through a first low power thyristor of which the striking circuit is connected to the first output terminals of said first flip-flop to render said low power thyristor conductive only by the voltage V*m* across said first output circuit of said first flip-flop after a changeover to the state B of said first flip-flop, the second input terminals of said second flip-flop being connected through a second low power thyristor to the second input terminals of said first flip-flop, said second thyristor having its striking circuit connected to the second output terminals of said first flip-flop, two first windings series connected to the second flip-flop output terminals and mounted respectively on a first and a second magnetic circuit with rectangular hysteresis curve and having a number of turns sufficient to saturate these magnetic circuits when a voltage V*e* is set up across said circuit of said second flip-flop first output, two second windings series connected to the second output circuit of said second flip-flop mounted on said both magnetic circuits having the same number of turns as said first windings but having ampere turns in opposite direction under the effect of a voltage V*e* across said second output circuit of said second flip-flop, each of said first and second magnetic circuits having respectively two secondary windings, each of these secondary windings being connected to the striking circuits of one of said switching impedance thyristors through delay lines capable of introducing a delay in the striking of the thyristors.

References Cited

UNITED STATES PATENTS

| | | | |
|---|---|---|---|
| 2,959,726 | 11/1960 | Jensen | 321—18 |
| 3,040,239 | 6/1962 | Walker | 323—24 |
| 3,174,096 | 3/1965 | Lichowsky. | |
| 3,195,036 | 7/1965 | McNulty et al. | 323—43.5 X |
| 3,204,113 | 8/1965 | Snygg | 307—88.5 |
| 3,263,157 | 7/1966 | Klein | 323—43.5 X |

JOHN F. COUCH, *Primary Examiner.*

W. E. RAY, A. D. PELLINEN, *Assistant Examiners.*